United States Patent
Abellan Sevilla

(10) Patent No.: US 7,779,455 B2
(45) Date of Patent: Aug. 17, 2010

(54) PROCEDURE FOR MONITORING THE USAGE OF A BROADCASTED CONTENT

(75) Inventor: Jorge Abellan Sevilla, Montrouge (FR)

(73) Assignee: AXALTO SA, Meudon Cedex (FR)

( * ) Notice: Subject to any disclaimer, the term of this patent is extended or adjusted under 35 U.S.C. 154(b) by 782 days.

(21) Appl. No.: 10/565,567

(22) PCT Filed: Jul. 12, 2004

(86) PCT No.: PCT/IB2004/002345

§ 371 (c)(1),
(2), (4) Date: Jan. 23, 2006

(87) PCT Pub. No.: WO2005/009041

PCT Pub. Date: Jan. 27, 2005

(65) Prior Publication Data

US 2006/0189296 A1 Aug. 24, 2006

(30) Foreign Application Priority Data

Jul. 23, 2003 (EP) .................. 03291823
Oct. 29, 2003 (EP) .................. 03292704

(51) Int. Cl.
*G06F 21/00* (2006.01)
(52) U.S. Cl. ......................... 726/6; 713/194
(58) Field of Classification Search ............ 726/6, 726/17, 26; 713/194
See application file for complete search history.

(56) References Cited

U.S. PATENT DOCUMENTS 6,832,731 B2 * 12/2004 Kaneko ............... 235/492
2002/0048367 A1 4/2002 Maillard
2002/0048369 A1 * 4/2002 Ginter et al. ........... 380/277

FOREIGN PATENT DOCUMENTS

EP 1 263 230 12/2002
WO WO-02/47356 6/2002

OTHER PUBLICATIONS

International Search Report dated Nov. 12, 2004 (2 pages).

* cited by examiner

Primary Examiner—Gilberto Barron, Jr.
Assistant Examiner—Simon Kanaan
(74) Attorney, Agent, or Firm—Osha • Liang LLP

(57) ABSTRACT

Method for monitoring the usage of a service by a communication device coupled to a tamper resistant module, in particular a smart card. A said service is transmitted from a resource able to communicate with said communication device by way of a network. The service comprises a plurality of encrypted data flow and its use comprises successive decryption steps of data flow by a respective first key EK, said first key EK being encrypted in the data flow and decrypted in the tamper resistant module by way of a second key KEK stored in said tamper resistant module or derived inside said module. The invention is characterized in that said method comprises the following steps: a. A counting step, in which a memory location stores a count of occurrences of decryption steps of said first key EK attached to a same service; b. A using step, in which said counter is used to prove the amount of data flow which has been decrypted.

19 Claims, 2 Drawing Sheets

PROCEDURE FOR MONITORING THE USAGE OF A BROADCASTED CONTENT

FIELD OF THE INVENTION

The invention describes mechanisms to enable an accurate monitoring of the services used by a subscriber of a service, in particular a broadcast service. The invention relates to services that are broadcasted through a network, in particular a wired/wireless. The invention also applies particularly to services transmitted in an encrypted manner with keys that are managed inside a tamper resistant module such as a smartcard or any module which is indifferently external or internal to a communication device able to receive services by way of a network.

PRIOR ART

A broadcast service corresponds to a specific data flow that is broadcasted through a network. FIG. 1 gives a schematic view of a service including three data flows. To enable that only subscribed users may access to a specific service, this data flow may be encrypted with an encryption key (EK) that is given through different mechanisms to users who has subscribed to this particular service.

To avoid that unsubscribed users may access to the EK and so be able to use the service for free, this EK is usually renewed frequently. One of the mechanisms of this renewal of keys that is currently used consists on the following components:

- a smart card (or any other hardware protected and tamper resistant module) is provided to the subscribers accessing a particular service. This smartcard is provisioned with a key encryption key (KEK), which is the same for all subscribers accessing this particular service. This KEK may also be updated by means of different mechanisms. One needed characteristic of this KEK is that it is never revealed in clear outside the smartcard. Whether it needs (for managing purposes, for instance) to be handed through unsafe network entities (e.g. the terminals) this is also encrypted. The KEK is identified by a KEK identifier (KEK_ID), associated to a particular broadcasted service.
- each data flow is broadcasted encrypted with a respective key EK. The data flow contains regularly some data, Management Container (MC), which is used for key management and eventually for other purposes. This MC may contain:
  - The identifier of the KEK (KEK_ID) that is being used in the current broadcasted service.
  - An encrypted encryption key (EEK), that corresponds to the EK being used in the current data flow encrypted with the KEK corresponding to the KEK_ID being sent.
  - Other additional data that will be further considered in this document.
- A terminal that is responsible to listen the data flow corresponding to the broadcasted service. The terminal is also responsible for decrypting the data flow using the valid EK.

To obtain the valid EK the terminal regularly receives the MC and retrieves the KEK_ID and the EEK. Further, it sends this information to the smartcard, asking it to decrypt this EEK to obtain the corresponding EK. This decryption is performed using the KEK (stored in the smartcard or derived inside the smartcard) that corresponds to the KEK_ID being used. If the KEK_ID is known by the smartcard, it can then decrypt the EEK and send the EK back to the terminal. In this way, the terminal can continue to decrypt the data flow.

As it is shown in the FIG. 1, the broadcast service provider is able to dynamically change regularly the EK, just by sending a new EEK in a previous MC message. On this figure, the Broadcast Data Flow includes:

- Data Flow (EK1): Data Flow associated with a particular service encrypted with EK1
- MC1: Management container including a new EEK2 associated with a new EK2.
- MC2: Management container including a new EEK3 associated with a new EK3.

The explained model is well adapted to provide a frequent renewal of keys based in the above broadcast principles. In this model, a particular user does not need to contact the service provider every time that new encryption keys are needed to decrypt the content. the terminal just needs to obtain the EEK listening to the broadcasted data flow and ask locally the smartcard to retrieve the EK needed.

However, there is a main limitation in this model: the service provider, or any other network entity responsible for control or charging of a particular broadcast service, hereafter referred as service controller (SC), is not able to know whether the user has effectively used this particular service.

As the renewal of keys is performed locally, the problem is that the service controller SC is not able to know whether the user has effectively used the broadcast content, as it is not aware if the broadcasted EEK has being used by the terminal or not. This is a big problem for services that are charged by the amount of data being used (time or volume charging).

THE INVENTION

The aim of the invention is to facilitate the use of a service by an operator.

According to the invention, the smartcard is provided with one or more counters associated to a particular broadcast service. The invention comprises the following steps:

- A counting step, in which a memory location stores a count of occurrences of decryption steps of data flow attached to a same service;
- A using step, in which said counter is used to prove the amount of data flow which has been decrypted.

So that, a counter is incremented each time a decryption step is performed. In this way an operator can easily monitors the use of services.

We will see that, thanks to the invention, the terminal is able to send back parameters describing the time (or the volume of data) that the user has been using a particular broadcast service.

Advantageously, as the terminal is highly suitable to be attacked by a user, we will see that this is the smart card which will be used to monitor the use of services.

It will be easier to understand the invention on reading the description below, given as an example and referring to the attached drawings.

DETAILED DESCRIPTION OF EXAMPLES ILLUSTRATING THE INVENTION

Figure 1:
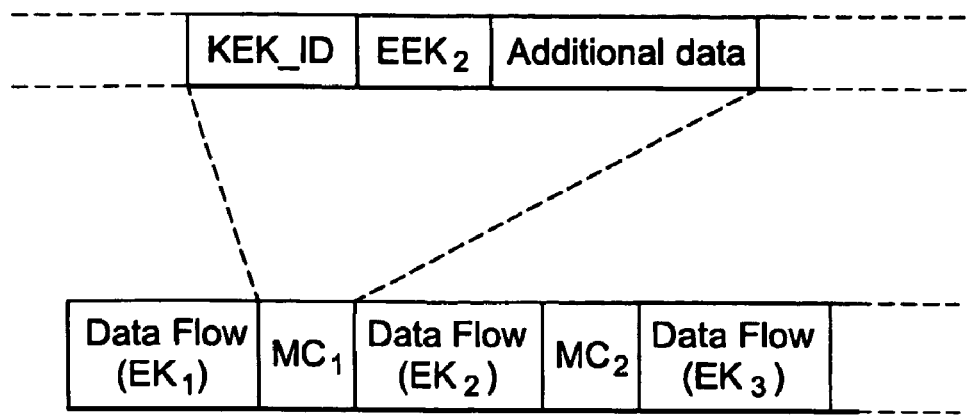
FIG. 1 is a schematic view of data flow included in a service.
Figure 2:
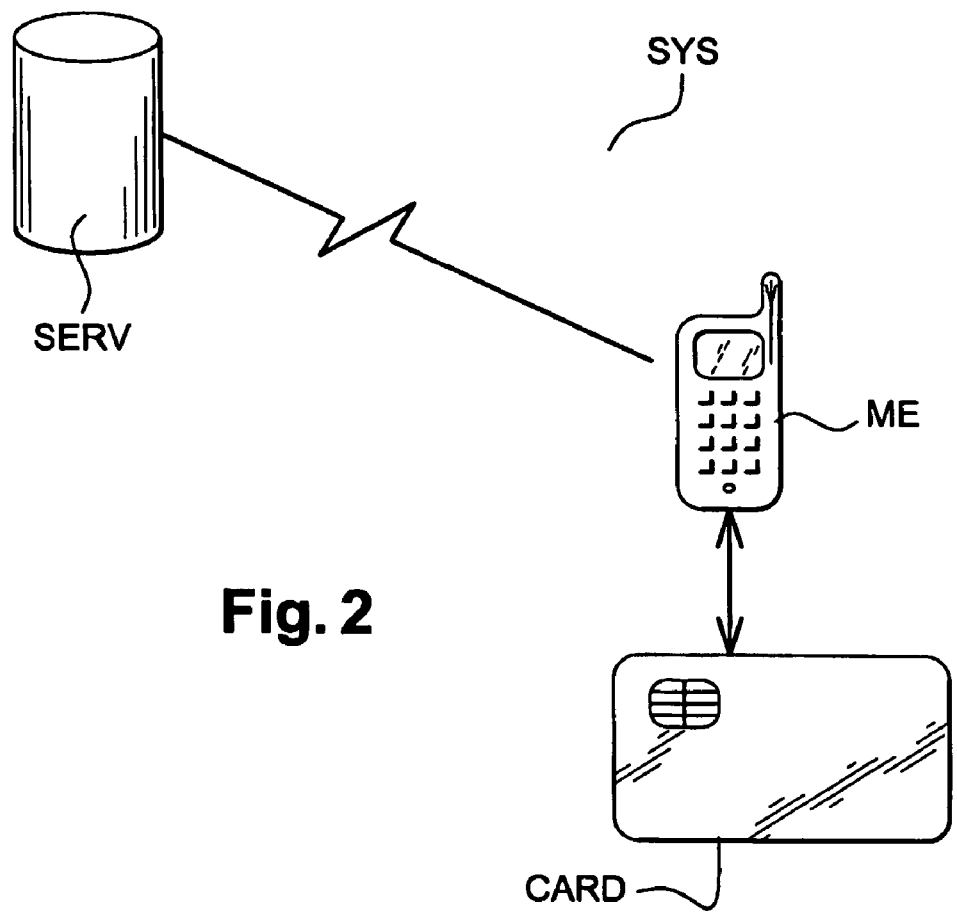
FIG. 2 is a block diagram view of the architecture of a computer system on which the solution can be applied.

To simplify the description, the same elements illustrated in the drawings have the same references.

FIG. 1 represents a system SYS including a user equipment communicating with a server SERV by way of a network NET such as Internet or private network. The user equipment consists of two parts: the Mobile Equipment ME and the Subscriber Identity Module CARD. The mobile equipment ME is the radio terminal used for radio communication between the user equipment and the server SERV. In our example, the card CARD is a USIM smart card that holds the subscriber identity, performs authentication algorithms, and stores authentication and encryption keys and some subscription information that is needed at the terminal.

The server SERV is able to provide a service to said mobile equipment.

The proposed solution consists in the following new elements:

The smartcard is provided with one or more counters associated to a particular broadcast service (and so, to a particular KEK). These counters are referred hereafter as encryption key counters (EKC).

Additionally the smartcard is provided with at least three fields for each of the broadcast services: Current EEK (CEEK) and current EK (CEK) and one or more maximum EKC value (MEKC) (one for each EKC).

Figure 3:
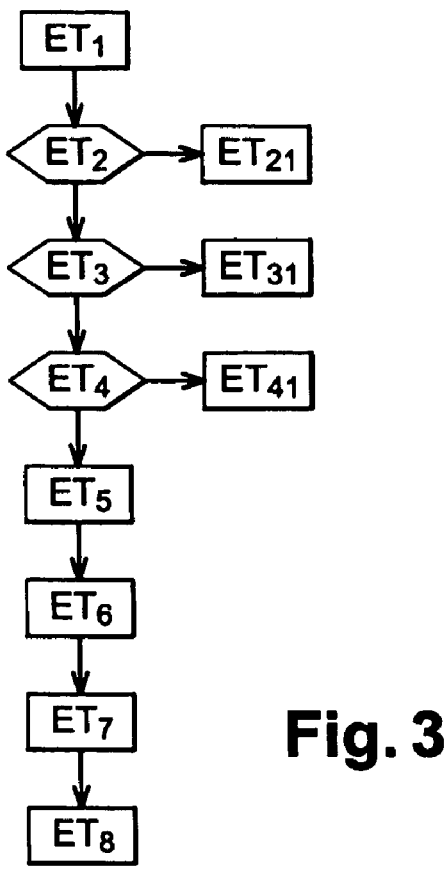
FIG. 3 is an algorithm illustrating the main steps of the invention.

After the terminal has received a service, the following procedures are applied (see FIG. 3):

Every time the terminal needs to renew the EK (associated with the reception of a MC message) it sends in a $1^{st}$ step ET1 a PROVIDE-EK command to the smartcard. This command contains at least the broadcasted values KEK_ID and the EEK.

The smartcard receives these values and performs the following tasks:

A) In step ET2, It searches if the KEK_ID exist (meaning that the using is subscribed to this particular broadcast service). If it does not, it refuses further processing of the command, sending a corresponding error message to the terminal (step ET21). If it exist it continues the execution.

B) In step ET3, it tests whether the EEK correspond to the stored CEEK. If it does, it sends back the stored CEK in step ET31. Else, It continues the execution.

C) In step ET4, it tests whether each of the EKC is smaller than the MEKC associated; if yes, in step ET4, it adds one to the EKC values and continue in step ET5. Else, it stops the execution at step ET41, sending a corresponding error message to the terminal.

D) In step ET6, it uses the content of the KEK associated with the KEK_ID to decrypt the EEK obtaining the new EK to be used by the terminal for decrypting the data flow. Further it stores in step ET7 this values in CEEK and CEK. Then, in step ET8, it sends back the current EK to the terminal.

Figure 4:
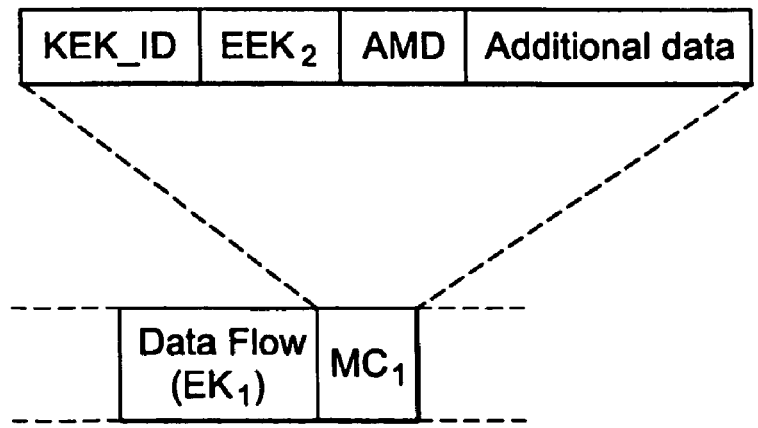
FIG. 4 illustrates an embodiment in which some additional data are added to flow data attached to a broadcast service.

Additionally, referring to FIG. 4, a management container MC may contain additional management data (AMD) containing:

A command header defining at least one of the following functions:
A-Change KEK
B-Update counter
C-Retrieve Subscription data. (e.g. EKC)

At least the following command parameters depending on the command header:
A-KEK_ID and New KEK value
B-KEK_ID, counter number, reset value
C-KEK_ID Preferably, this additional management data AMD is encrypted with an upper level key, management key (MK) that can be provisioned in each of the smartcards.

When receiving a management container MC that contains an encrypted AMD, the terminal, will pass it to the card through a MANAGEMENT_OPERATION command. The card will perform the corresponding actions and will send back to the terminal the corresponding results/response data encrypted and integrity protected with the same MK. The terminal will be responsible to send back this information to the server SERV through a known protocol based in a point-to-point mechanism.

Additionally, the same procedure may be defined if the AMD is not broadcasted in the Data flow but sent directly to the terminal in a point-to-point schema.

The main advantage of this approach is that it is resistant to attacks in the terminal:

A-Some AMD are needed to perform some required operations to enable the subscriber continue receiving the Broadcast service (e.g. modify KEK_ID)

B-Further, from the terminal/user perspective, it is impossible to know which is the nature of the command/results being sent to/from the smartcard, As a consequence from A and B, the terminal cannot be modified/hacked in order to tamper/avoid the correct commands that are responsible of the subscriber charging, without consequences in the subscriber's service. (denial of service).

For example, a Mobile Network Operator (MNO) offers to its subscribers the possibility to subscribe to one Multimedia Broadcast Service (MBS). All MNO's subscribers have a terminal that may listen the broadcasted data. However only the subscribers of the Broadcast service are provided with the following mechanisms in its USIM (Universal subscriber identity module):

A KEK_ID corresponding to this Service
Two counters EKC1, EKC2
One MEKC2
A MK that may be associated with different services.
The service is provided following some principles:
The KEK is usually changed once per month.
The subscribers are charged each month by the amount of time that have been accessing the service.
For parental control restrictions policy, some subscribers are limited to a certain amount of time each day. The MECK2 is then provisioned to a certain value.

The EK is changed regularly (each minute). Additionally, MC message are broadcasted more often, even with the same KEK-ID and EEK pairs (With or without AMD). When the subscriber is using the service, a PROVIDE-EK command with a new EK is then performed on the average of once a minute.

The following communications related to this particular MBS can be held between the terminal and the MNO in a point-to-point base:

Once a day each terminal/USIM receives an AMD containing a Update counter request with the value zero to the MECK2 counter. The MNO receives a confirmation of the result of this operation.

At least once a month, the terminal/USIM receives an AMD containing a Retrieve Subscription data command. The command result is sent back to the MNO. This is used by the MNO to generate the corresponding charging records by using the EKC1 counter value.

For security reasons the KEK is usually changed at least once per month by receiving the terminal/USIM the Change KEK command.

Additionally different services may be provided with different KEK_ID. The different combinations of EK change, EKC and MEKC provide the necessary flexibility in the charging and monitoring of the service being used.

The invention claimed is:

1. A method for monitoring usage of a service by a communication device coupled to a smart card, said service being transmitted from a resource able to communicate with said communication device by way of a network, said service comprising a plurality of encrypted data flow, the use of said service comprising successive decryption steps of data flow using a first key, said first key being encrypted in the data flow and decrypted in the smart card by way of a second key stored in said smart card, the method comprising:
   a counting step, in which a memory location stores a count of occurrences of decryption steps of said first key attached to the service,
   wherein the counting step comprises:
   receiving the first key encrypted by way of the second key;
   determining whether the first key corresponds to a previously stored encrypted key;
   when the first key corresponds to the previously stored encrypted key:
      sending, to the communication device, a previously stored decrypted version of the previously stored encrypted key without performing the decryption of the received encrypted first key;
   when the first key does not correspond to the previously stored key:
      incrementing the counter;
      decrypting the received encrypted first key to obtain a new decrypted first key to be used for decrypting data flow; and
      storing the received encrypted first key and the new decrypted first key; and
   a using step, in which said counter is used to determine a service fee for use of said service.

2. Method according to claim 1, characterized in that the smart card stores a predetermined fixed number, and in that it comprises a comparison step in which the incrementing counter is compared to the predetermined fixed number for checking if the counter has reached or not the value of the fixed number; if yes, adequate action can be performed.

3. Method according to claim 1, characterized in that a command is sent to the smart card for renewing the second key.

4. Method according to claim 1, characterized in that a command is sent to the smart card for Updating the counter.

5. Method according to claim 3, characterized in that said command is encrypted by a third key known by the smart card.

6. Method according to claim 2, characterized in that the action is the completion of decryption steps.

7. Method according to claim 1, characterized in that, each first key is sent periodically, and in that the amount of data is converted into time of use limiting the use of a service in time.

8. Method according to claim 4, characterized in that said commands are transmitted to the smart card by way of the communication device, said communication device including a program for authorizing the transmission of such commands without reading its content.

9. Method according to claim 4, characterized in that said command is encrypted by a third key known by the smart card.

10. Method according to claim 5, characterized in that said commands are transmitted to the smart card by way of the communication device, said communication device including a program for authorizing the transmission of such commands without reading its content.

11. Method according to claim 1, wherein the method further comprises upon reception of a management container:
   performing a retrieval of the counter; and
   sending management data to the resource through a protocol based in a point-to-point mechanism.

12. Method according to claim 1, wherein the method further comprises:
   associating at least two counters to a particular service; and
   resetting one of the at least two counters, wherein the other counter is not reset at the same time.

13. Method according to claim 1, wherein the resource communicates with said communication device over a network.

14. A smartcard, able to receive services from a network, said services comprising a plurality of encrypted data flow, the use of said service comprising successive decryption steps of data flow by a respective first key, said first key being encrypted in the data flow and decrypted in said smart card by way of a second key stored in said smart card or derived inside said smart card, characterized in that smart card comprises a microcontroller able to perform the following steps:
   a counting step, in which a memory location stores a count of occurrences of decryption steps of said first key attached to the service,
   wherein the counting step comprises:
   receiving the first key encrypted by way of the second key;
   determining whether the first key corresponds to a previously stored encrypted key;
   when the first key corresponds to the previously stored encrypted key:
      sending, to the communication device, a previously stored decrypted version of the previously stored encrypted key without performing the decryption of the received encrypted first key;
   when the first key does not correspond to the previously stored key:
      incrementing the counter;
      decrypting the received encrypted first key to obtain a new decrypted first key to be used for decrypting data flow; and
      storing the received encrypted first key and the new decrypted first key; and
   a using step, in which said counter is used to determine a service fee for use of said service.

15. A method for monitoring use of a service by a communication device, comprising:
   receiving, by a smart card coupled with the communication device, encrypted data flow as part of a service transmitted to the communication device by a resource over a network, and wherein the encrypted data flow comprises an encrypted first key and encrypted data;
   determining whether the encrypted first key corresponds to a previously stored encrypted key;
   when the encrypted first key corresponds to the previously stored encrypted key:

sending, to the communication device, a previously stored decrypted version of the previously stored encrypted first key without decrypting the received encrypted first key;

when the encrypted first key does not correspond to the previously stored encrypted key:
incrementing a counter, wherein the counter stores a count of occurrences of decryptions performed for encrypted keys associated with the service;
decrypting the encrypted first key using a second key stored on the smart card to obtain a decrypted first key to be used for decrypting the encrypted data; and
storing the encrypted first key and the decrypted first key, wherein the counter is used to determine a service fee for use of the service.

16. The method according to claim 15, wherein the communication device does not use the decrypted first key to decrypt the service received by the communication device when the counter exceeds a predetermined fixed number stored on the smart card.

17. The method according to claim 15, wherein a command is sent to the smart card for renewing the second key.

18. The method according to claim 15, wherein a command is sent to the smart card for updating the counter.

19. The method according to claim 18, wherein the command is transmitted to the smart card by way of the communication device and the communication device uses a program for authorizing the transmission of the command without reading its content.

* * * * *